United States Patent
Fujita et al.

(10) Patent No.: US 6,921,132 B2
(45) Date of Patent: Jul. 26, 2005

(54) SEAT STRUCTURE

(75) Inventors: Etsunori Fujita, Hiroshima (JP);
Yutaka Sakamoto, Hiroshima (JP);
Kazuyoshi Chizuka, Hiroshima (JP);
Seiji Kawasaki, Hiroshima (JP);
Yasuhide Takata, Hiroshima (JP);
Yumi Ogura, Hiroshima (JP);
Shigehiko Kaneko, Kawaguchi (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/839,052

(22) Filed: May 5, 2004

(65) Prior Publication Data

US 2004/0232743 A1 Nov. 25, 2004

(30) Foreign Application Priority Data

May 6, 2003 (JP) ...................................... 2003-128030

(51) Int. Cl.⁷ ................................................ B60N 2/42
(52) U.S. Cl. ............................. 297/216.13; 297/452.56
(58) Field of Search ....................... 297/216.13, 216.14, 297/216.1, 284.4, 452.18, 452.56

(56) References Cited

U.S. PATENT DOCUMENTS 5,318,341 A * 6/1994 Griswold et al. ...... 297/362.11
5,509,716 A * 4/1996 Kolena et al. .......... 297/216.13
6,056,366 A * 5/2000 Haynes et al. .......... 297/452.18
6,769,737 B2 * 8/2004 Choi ....................... 297/216.14
2004/0070240 A1 * 4/2004 Haland et al. .......... 297/216.12

\* cited by examiner

Primary Examiner—Milton Nelson, Jr.
(74) Attorney, Agent, or Firm—Steinberg & Raskin, P.C.

(57) ABSTRACT

In order to improve vibration absorbency and impact absorbency, the seat structure includes a swing member provided in a manner to be able to swing at least back and forth on a rear frame member positioned around the rear of a seat cushion, a pelvis supporting member connected to the swing member at the vicinity of the lower portion of the pelvis supporting member and disposed behind the pelvis of a seated person, and coil springs as an elastic member to support the pelvis supporting member biasing in the direction pushing forwards in a normal seating state. Accordingly, vibration inputted from the seat back side and as if patting on the back of the human body can be absorbed by the pelvis supporting member supported elastically. Besides, since the pelvis supporting member is connected to the rear frame member via the swing member, since pivoting movement in the back-and-forth direction of the pelvis supporting member is performed with a connecting portion of the swing member and the rear frame member as the center, and the radius of gyration is large, the vicinity of the lower portion of the pelvis supporting member never presses the pelvis.

15 Claims, 6 Drawing Sheets

FIG. 5A
NORMAL SEATING

FIG. 5B
ON COLLISION

F I G. 6

SEAT STRUCTURE

BACKGROUND OF THE INVENTION

1. Field of the Invention

The present invention relates to a seat structure, to be in more detail, a seat structure suitably used for a seat of a transportation equipment such as a plain, a train, a ship, a fork lift and an automobile.

2. Description of the Relevant Art

Patent Document 1 (Japanese Patent Application Laid-open No. 2002-177099) discloses a vehicle seat using a three-dimensional net member (solid knitted fabric) which is excellent in cushioning property even in a thin-type as a cushioning layer, for instance. The cushioning property is served by straining respective cushioning layers made of a three-dimensional net member over a back frame and a cushion frame for forming a seat back and a seat cushion to use as a tension structure.

The vehicle seat disclosed in Patent Document 1 is provided with a sufficient cushioning property even in a thin-type as described above, and excellent air permeability, since it uses a three-dimensional net member. However, the vehicle seat disclosed in Patent Document 1 is allowed to have a vibration absorbing function by providing a flat-type supporting member supported by coil springs at the lower portion of the three-dimensional net member on a seat cushion side, and a vibration absorption measure on a seat back side is not considered to be so important. Besides, the three-dimensional net member provided on the seat back is strained with low tension, which sometimes makes an impression that a slight slack exists in the vicinity corresponding to the waist portion of a seated person, causing a problem in appearance.

Meanwhile, especially in a seat for transportation equipment such as an automobile, improvement in impact absorbing function against collision or the like as well as improvement in the above-described vibration absorbing function is always requested to be solved. Though it is an example of a vehicle seat not using a cushioning layer composed of a tension structure in which a three-dimensional net member or the like is strained over a back frame, in Patent Document 2 (Japanese Patent Application No. Hei 11-278128), for instance, disclosed is a vehicle seat, which includes: a pair of cantilever type outer pipes divided into two and each one end being fixed into each side frame; and inner pipes accommodated in the pair of outer pipes, on the lower portion of the back frame, and when impact force beyond a predetermined limit is inputted by collision, the outer pipes are easily bent rightwards, leftwards, and backwards, and at the same time, the inner pipes are slid in the inside of the outer pipes to hold the waist portion of the human body deeply in the seat back so that a slipping-up phenomenon of the human body is prevented.

In order to improve the impact absorbing function, it is desirable to hold a portion from the waist portion to the haunches of the human body (namely, the pelvis portion) deeply in the seat back at the time of collision, as disclosed in Patent Document 2. This is the same as in the case of a seat using a cushioning layer composed of a tension structure such as a three-dimensional net member strained over a back frame. However, in the structure disclosed in Patent Document 2, even though the outer pipes are divided into two, since the inner pipes are housed therein, the stiffness of the pipes perform as an obstacle to backward movement of the human body such as sliding into the seat back. Therefore, it is requested to realize a structure capable of performing backward displacement of the human body more quickly.

SUMMARY OF THE INVENTION

The present invention has been made in consideration of the circumstances described above, and an object of the present invention is to provide a seat structure capable of improving vibration absorbency or appearance when a cushioning layer provided by straining, for instance, a three-dimensional net member (or a two-dimensional net member, a thin urethane material, or the like) as a tension structure is used. Other object of the present invention is to provide a seat structure possible to hold a portion from the waist portion to the haunches of the human body (the pelvis portion) quickly and deeply in the seat back when impact force due to collision etc. is inputted so that the impact force absorbency function can be improved. In order to solve the above-described problem, in the present invention, there is provided a seat structure including a seat back and a seat cushion, and the seat structure is characterized by being composed of:

a swing member provided to be able to swing at least back and forth on a rear frame member positioned around the rear of the seat cushion;

a pelvis supporting member connected to the swing member at the vicinity of the lower portion of the pelvis supporting member, and disposed behind the pelvis of a seated person;

an elastic member to urge the pelvis supporting member in the direction pushing forwards; and a cushioning layer covering the pelvis supporting member, and provided on a back frame forming the seat back.

In the present invention, there is provided the seat structure in which the pelvis supporting member is formed like a plate having a predetermined width and length.

In the present invention, there is provided the seat structure in which the pelvis supporting member is formed like a plate having a predetermined width and length, and the vicinity of the upper portion is bent backwards.

In the present invention, there is provided the seat structure in which the vicinity of the center portion along the width of the pelvis supporting member is bulged backwards.

In the present invention, there is provided the seat structure in which at least a portion of the pelvis supporting member is made of synthetic resin, a three-dimensional net member, a two-dimensional net member, or rubber.

In the present invention, there is provided the seat structure in which the elastic member is formed having coil springs disposed at least one piece each on respective both sides of the plate-shaped pelvis supporting member, and one engaging end of each coil spring is connected to each side portion of the pelvis supporting member and the other engaging end of each coil spring is connected to a frame member positioned upper than the above-described rear frame member at a portion positioned ahead of the connecting position of the above-described each one engaging end with each side portion of the pelvis supporting member.

In the present invention, there is provided the seat structure in which the above-described swing member is composed of a low or non-elastic member lower in elasticity rate than the elastic member, and one end is connected to the rear frame member, and the other end is connected to the vicinity of the lower portion of the pelvis supporting member.

In the present invention, there is provided the seat structure in which the seat structure includes a band member provided on the back face side of the cushioning layer, at a position corresponding to the vicinity of the body side of a seated person in a manner that an upper end thereof is connected to the vicinity of the upper portion of the back frame and the lower end thereof is connected to the pelvis supporting member respectively.

In the present invention, there is provided the seat structure in which the band member is provided substantially in a V-shape expanding from the lower end toward the upper end.

In the present invention, there is provided the seat structure in which a lateral band member is provided above the pelvis supporting member and between side frame members for forming the back frame.

In the present invention, there is provided the seat structure in which the lateral band member is connected to respective side frames via elastic members.

BRIEF DESCRIPTION OF THE DRAWINGS

The foregoing and still other objects and advantages of the present invention will be more apparent from the following detailed explanation of the preferred embodiments of the invention in connection with the accompanying drawings.

DETAILED DESCRIPTION OF THE INVENTION

Figure 1:
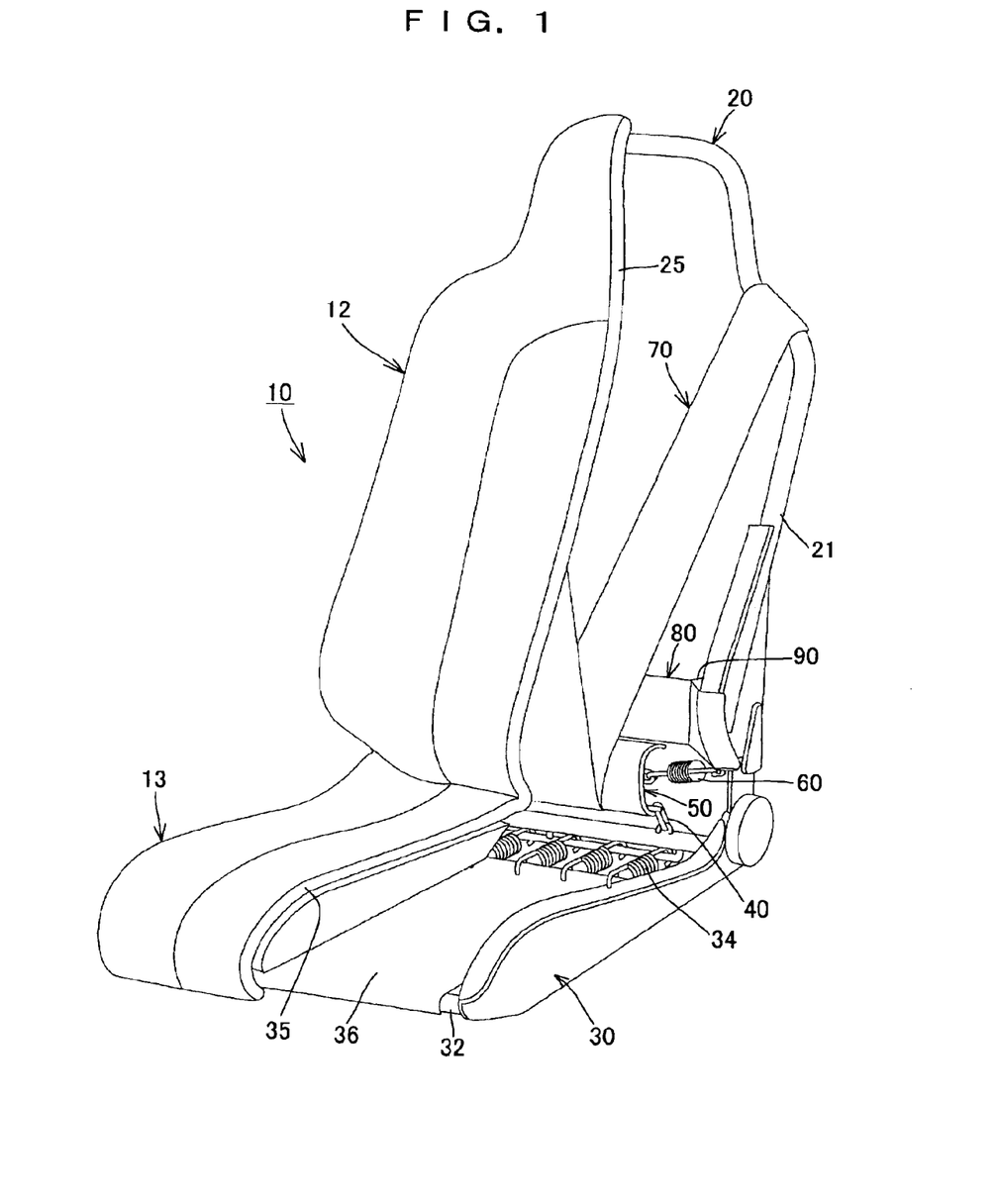
FIG. 1 is a diagrammatic perspective cutaway view showing a seat structure according to a first embodiment of the present invention.

Hereinafter, the present invention will be explained in more detail based on an embodiment shown in the drawings. FIG. 1 is a diagrammatic perspective view showing a first embodiment of the present invention. As shown in the drawing, a seat structure 10 of the present embodiment is composed of a seat back 12 and a seat cushion 13, the seat back 12 includes a back frame 20 and a cushioning layer 25 strained over the back frame 20 with low tension, and the seat cushion 13 includes a cushion frame 30 and a cushioning layer 35 strained over the cushion frame 30 with low tension.

Figure 2:
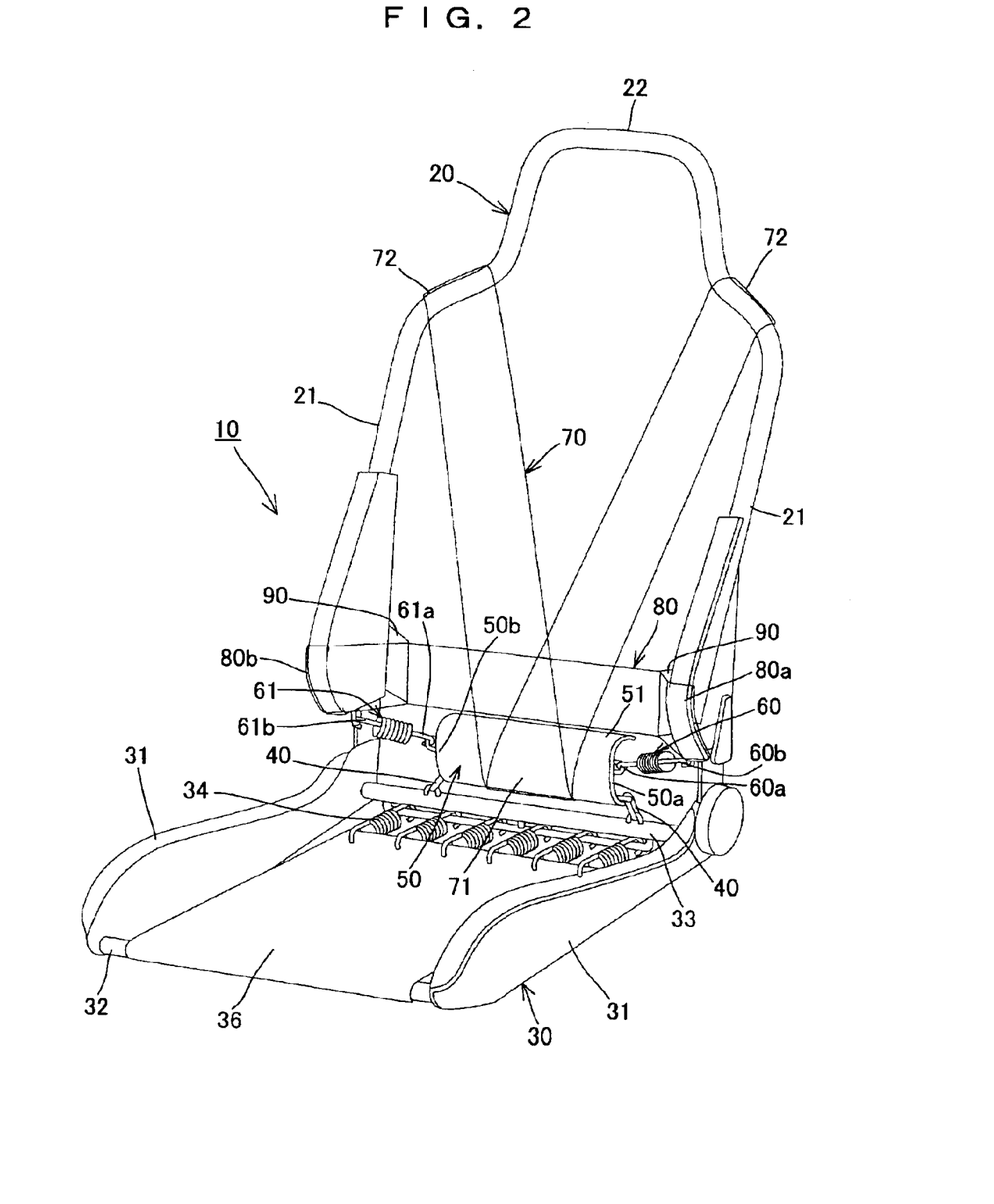
FIG. 2 is a diagrammatic perspective view showing the seat structure according to the above embodiment, excepting cushioning layers strained over a back frame and a cushion frame.

The back frame 20 is, in more detail, as shown in FIG. 1 and FIG. 2, composed of a pair of side frame members 21 and 21 disposed with a space between them along the width direction of the seat structure 10, and an upper frame member 22. The cushion frame 30 is structured with a pair of side frame members 31 and 31 disposed with an interval in the width direction, a front frame member 32 positioned in front of the seat cushion 13, and a rear frame member 33 positioned in the rear of the seat cushion 13. It should be noted that the rear frame member 33 is disposed at the position corresponding to the vicinity of a boundary between the seat back 12 and the seat cushion 13, and is explained as a constituent of a portion of the cushion frame 30 in this specification, but it can be regarded as a lower frame member constituting a portion of the back frame 20. In this event, provision of a swing member 40, which will be described later, on this lower frame member means to include in the present invention that "a swing member is provided on the rear frame member"

On the rear frame member 33, the swing member 40 is provided in a manner as to be able to swing at least back and forth. The phrase "to be able to swing at least back and forth" means it includes not only a member to be able to swing back and forth only, but also a member to swing from side to side in some degree while mainly swinging back and forth. As an example of the former, a member provided with a ring pivotably installed around the rear frame member 33 and a metal plate protrusively disposed on the ring, can be cited. As an example of the latter, such a member as string, wire, chain, or a band having any width (belt member) can be cited. In any case, it is preferable to use an elastic member having a lower elasticity rate than those of elastic members (coil springs 60 and 61) elastically supporting a pelvis supporting member 50 which will be described later, or a non-elastic member which scarcely expands or contracts in accordance with a back-and-forth movement of the pelvis supporting member 50 to which the swing member 40 is connected. This is for making the orbit of the back-and-forth movement of the pelvis supporting member 50 stable.

The swing member 40 is connected to the vicinity of a lower portion 52 of the pelvis supporting member 50. The pelvis supporting member 50 is formed in a plate shape having a predetermined width and length, and is disposed at a position corresponding to the rear of a seated person's pelvis portion. It is preferable that the lateral length is substantially the same length as the lateral length (width length) of the seated person's pelvis portion or longer than that, and the length (vertical length) is about the height of the seated person's pelvis portion. Though not shown, the swing member 40 is preferably formed in a lateral cross section (sectional shape along the width direction) having a shape of protruding the vicinity of nearly the center across the width backwards to increase holdability of the pelvis portion.

Figure 4:
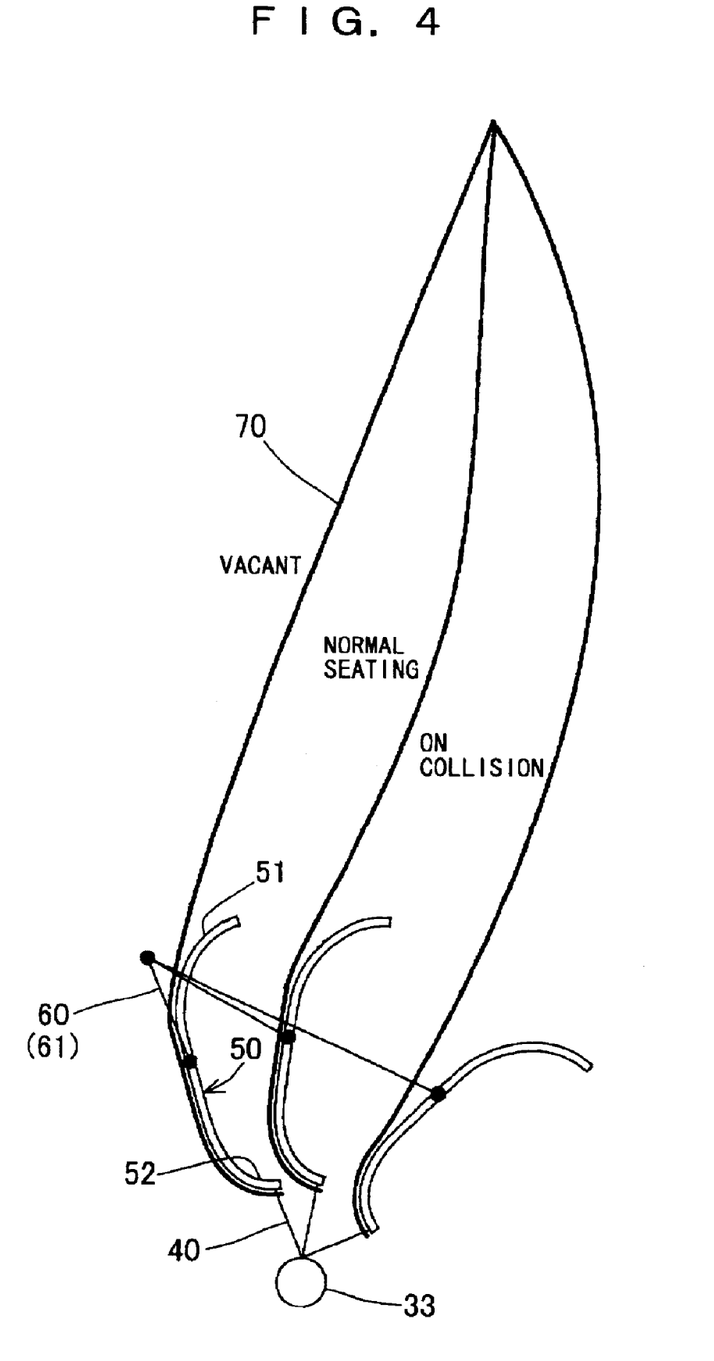
FIG. 4 is a view for explaining a function of the seat structure according to the above embodiment, showing the positional relationships among a pelvis supporting member, a swing member, and a band member when no one is seated, during normally seated, and at the time of collision diagrammatically.

As will be described later, the pelvis supporting member 50 of the present embodiment is pressed backwards by the pelvis of a seated person when the pelvis supporting member 50 receives an impact force beyond a predetermined limit, and functions to guide the pelvis of a seated person (from the haunches to the waist) backwards (seat back) by the movement of pressing back. Therefore, in order to facilitate the falling back movement due to the weight of the seated person, the longitudinal sectional shape (vertical sectional shape) is preferably formed in a shape in which near an upper portion 51 is bent backwards as shown in FIG. 2 and FIG. 4. By taking this shape, a feeling of hitting given to the seated person can be reduced when seating normally. Though the pelvis supporting member 50 may be made of metal, it is also possible to use a deformable plastic material, a three-dimensional net member (solid knitted fabric), a two-dimensional net member (including a two-dimensional woven fabric or knitted fabric) or rubber at least for a portion thereof, for keeping the pelvis supporting member 50 as it is when performing a vibration absorbing function when seating normally, and also for allowing backward movement when it receives an impact force beyond a predetermined limit as described above, to further enhance the absorption of the impact energy by the deforming of the pelvis supporting member 50 itself.

The pelvis supporting member 50 is supported by an elastic member in a state that the vicinity of the lower portion 52 is connected to the swing member 40 as described above in a manner as to be biased or urged in a direction pushed forwards under a normal condition. In the present embodiment, coil springs 60 and 61 disposed at least each one piece on both sides of the pelvis supporting member 50, are used as the elastic member. Respective coil springs 60 and 61 are connected to respective side portions 50a and 50b of the pelvis supporting member 50 at one side of the engaging ends 60a and 61a respectively, and the other engaging ends 60b and 61b of the respective coil springs 60 and 61 are connected to a frame member positioned above the rear frame member 33. In this embodiment, the other engaging ends 60b and 61b are connected to respective side frames 21 and 21 for forming the back frame 20. At this time, the other engaging ends 60b and 61b of the respective coil springs 60 and 61 are connected to portions positioned ahead of connecting positions of the one side of the engaging ends 60a and 61a to respective side portions 50a and 50b on the pelvis supporting member 50 in the side frames 21 and 21. As a result, by elasticity of respective coil springs 60 and 61, the pelvis supporting member 50 is always biased or urged forwards with a connecting portion of the swing member 40 to the rear frame member 33 as the center.

As an elastic member elastically supporting the pelvis supporting member 50, for instance, a torsion bar provided at the rear of the pelvis portion in the vicinity of the boundary between the seat back 12 and the seat cushion 13, and at a position shifted upward or downward, instead of the above-described rear frame member 33, or from the rear frame member 33, can be used. Then, the swing member 40 is connected to this torsion bar. However, in this case, since the swing member 40 needs to have a function to transmit the elastic force of the torsion bar to the pelvis supporting member 50, the swing member 40 is not provided to be able to swing with respect to the rear frame member 33 as described above, but is provided so as to swing back and forth in the twisting direction together with the torsion bar, and is connected to the swing member 40 in the vicinity of the lower portion 52 of the pelvis supporting member 50.

By connecting the pelvis supporting member 50 to the swing member 40 as described above, and by urging by means of the coil springs 60, 61 and the like as an elastic member, the pelvis supporting member 50 is to pivot back and forth, not with the vicinity of the lower portion 52 of the pelvis supporting member 50 as a center, but with the connecting portion of the swing member 40 and the rear frame member 33 positioned lower than the vicinity of the lower portion 52 as a center, or with the torsion bar as a center when the above-described torsion bar is used as an elastic member.

Figure 6:
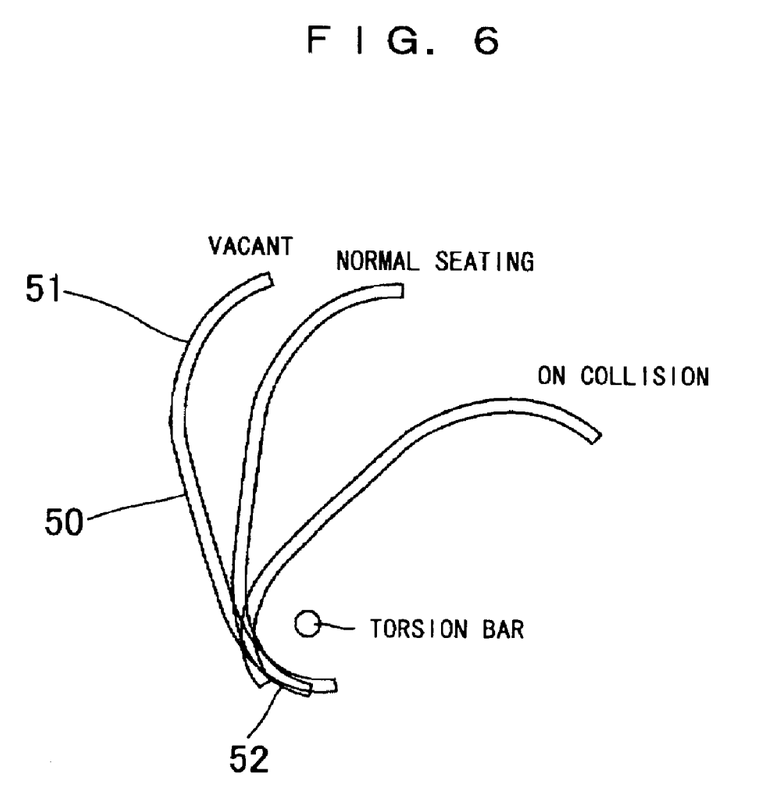
FIG. 6 is a diagrammatic view for explaining that the lower portion of the pelvis supporting member works to give an oppressive feeling on the pelvis portion depending on a manner of arrangement of the pelvis supporting member.

Here, as a means for solving the similar problem to the present invention, it is conceivable to take a structure that, as shown in FIG. 6, the vicinity of the lower portion 52 of the pelvis supporting member 50 is supported directly by the torsion bar to make it possible to pivot back and forth. According to such a structure, since the pelvis supporting member 50 is biased forwards by the elastic force of the torsion bar, a slight slack of the cushioning layer 25 provided over the back frame 20 is removed, a vibration absorbing function on the seat back 12 side is enhanced, and functions to guide the human body to pushing toward the seat back 12 by falling backwards of the pelvis supporting member 50 upon receiving further impact force. However, with such a structure, since the pelvis supporting member 50 is pivoted back and forth with the vicinity of the lower portion 52 connected to the torsion bar as a center, as shown in FIG. 6, the position in front and in the rear in the vicinity of the lower portion 52 scarcely changes with respect to the change of the position in front and in the rear in the vicinity of the upper portion 51 of the pelvis supporting member 50 at the time of vacant, normal seating, and collision.

Therefore, at the time of normal seating, even when a force to push backwards is applied by the pelvis of the human body, the vicinity of the lower portion 52 of the pelvis supporting member 50 does not stroke back and forth, easily produces a counterforce, and is difficult to follow a posture change. Therefore, an oppressive feeling is easily felt on the pelvis portion (in the vicinity from the haunches to the waist), and displacement toward the front of the haunches are apt to be produced. Besides, when impact due to collision or the like (upon receiving collision) is received, since the vicinity of the lower portion 52 of the pelvis supporting member 50 does not stroke back and forth, it is likely that a function to guide the human body to pushing toward the seat back 12 is reduced.

On the other hand, when it is structured so that the pelvis supporting member 50 is connected to the swing member 40, and to pivot back and forth with the end portion of the swing member 40 as the center as in the present embodiment, the vicinity of the lower portion 52 of the pelvis supporting member 50 displaces backwards easily at the time of normal seating and at the time of collision as shown in FIG. 4. Accordingly, since neither oppressive feeling felt at the vicinity of the lower portion of the pelvis at the time of normal seating, nor displacement forwards of the haunches is apt to arise, and the vicinity of the lower portion 52 of the pelvis supporting member 50 also displaces backwards easily at the time of collision, a function to guide the human body to pushing toward the seat back works well.

The seat structure 10 of the present embodiment is further provided with a band member 70 which is connected to the upper frame member 22 of the back frame 20 forming the seat back 12 at the upper end of the band member and connected to the vicinity of the lower portion of the pelvis supporting member 50 at the lower end of the band member covering the front face of the pelvis supporting member 50. This band member 70 is provided at the position corresponding to the vicinity of the body side of the human back. If no band member 70 is provided, the pelvis supporting member 50 is to be covered directly with the cushioning layer 25 forming the seat back 12. Even in this case, since the cushioning layer 25 is strained over the back frame 20, in other words, provided as a tension structure, the cushioning layer 25 pushes the pelvis supporting member 50 backwards when the back is pushed toward the cushioning layer 25. That is, the pelvis supporting member 50 can basically work together with the cushioning layer 25 even in such a structure. However, in order to reduce a feeling of something hitting the pelvis or a feeling something foreign, caused by the pelvis supporting member 50 as much as possible, it is preferable to provide the above-described band member 70 so as to work together with the cushioning layer 25 following the movement of the back quickly and surely.

A manner to strain the band member 70 between the back frame 20 and the pelvis supporting member 50 is arbitrary so far as the band member 70 keeps such a function. However, since there is a necessity to avoid pressure to the spinal cord when receiving an impact force by collision or the like and the human body displaces in the direction to be pushed toward the seat back 12, it is preferable to dispose the band member 70 at a position corresponding to the vicinity of the body side of the back as described above. When the human body is pushed toward the seat back strongly, in order to allow the human body to slip into the seat back more deeply while holding the vicinity of the body side, the band member 70 is preferably provided in a manner as to expand substantially in a V shape from a lower end 71 connected to the pelvis supporting member 50 toward an upper end 72 connected to the upper frame member 22 of the back frame 20, as shown in FIG. 2. Through this structure, when the human body is strongly pushed toward the seat back 12, and the pelvis supporting member 50 falls backwards with a connecting portion to the rear frame member 33 of the swing member 40 as the center, the back is slipped deeply into the seat back 12 while pushing the vicinity of the upper end 72 of the vee-shaped band member 70 toward outside (refer to FIG. 3 and FIG. 5B). If the band members 70 are provided substantially vertically along the vicinity of the body side, not provided in a V-shape, when the back is pushed toward the seat back 12, the band members 70 will open widely toward the outsides from the lower ends to the upper ends in one stroke. However, when the band member is provided in a V-shape as in the present embodiment, since the vicinity of the lower end 71 of the band member 70 is difficult to open, it opens moderately, and the impact force to the human body can be lessened even more.

The band member 70 can be formed using, for instance, a two-dimensional net member or a three-dimensional net member. As a two-dimensional net member, cloth structured with either of the warp or the weft made of, for instance, elastic yarn such as polyester elastomer fiber, polyurethane fiber, or the like, and the other made of common yarn such as nylon fiber, polyester fiber, or the like, which has smaller elasticity than the elastic yarn, can be used. As a three-dimensional net member, a solid knitted fabric structured with a pair of ground knitted fabrics disposed at a predetermined interval and allowing connecting yarn to shuttle to-and-fro between the ground knitted fabrics with, for instance, a Double Raschel knitting machine, can be used.

It is also preferable to provide a lateral band member 80 which is disposed in the vicinity of a waist supporting portion above the pelvis supporting member 50 and between the side frame members 21 and 21 forming the back frame 20, passing through the back face side of the above-described band member 70. By taking such a structure, it can disperse impact energy more efficiently, because, since the band member 70 is connected to the pelvis supporting member 50, when the pelvis supporting member 50 works together with the band member 70, the above-described lateral band member 80 also works together so that the elastic force of the coil springs 60 and 61 supporting the pelvis supporting member 50 affects in a wider range. Note that, the lateral band member 80 can be formed using a two-dimensional net member or a three-dimensional net member similarly to the above-described band member 70.

Further, in the present embodiment, respective end portions 80a and 80b of the lateral band member 80 are connected to respective side frames 21 and 21, and an elastic member 90 made of cloth containing elastic yarn or rubber and having larger elasticity than that of the lateral band member 80 is disposed by straining between the rear end sides of respective side frames 21 and 21, and some midpoint of the lateral band member 80. Accordingly, when the band member 70 and the lateral band member 80 work together against the pelvis supporting member 50 as described above, the elasticity of the elastic member 90 works further to enhance the absorbency of the vibration energy. In addition to that, cushioning force at the time of receiving large impact can be enhanced.

On the other hand, in the seat cushion 13, according to the present embodiment, there is provided a flat-type supporting member 36 for seat cushion engaged with the front frame member 32 of the cushion frame 30 at the front end edge and elastically supported by the rear frame member 33 at the rear end edge via a plurality of coil springs 34. The flat-type supporting member 36 for seat cushion performs a vibration absorbing function and impact absorbing function on the seat cushion 13 side by being supported elastically by the cushion frame 30. Further, as in the present embodiment, by taking a structure so that the rear end edge elastically supports the rear frame member 33, a barycentric position of the human body near the pelvis is easy to come down and a seating angle is formed, which are preferable for stability of a feeling of seating. However, the main feature of the present invention is to consistently improve the vibration absorbing function and the impact absorbing function on the seat back 12 side by providing the pelvis supporting member 50, and a manner to dispose the flat-type supporting member 36 for seat cushion for performing mainly the vibration absorbing function and the impact absorbing function in the seat cushion 13 is not limited to any specific manner at all. For instance, it is also acceptable to allow the side frames 31 and 31 to support the flat-type supporting member 36 for seat cushion via coil springs, or to provide a torsion bar in the vicinity of the rear frame member 33, and also provide a frame member to be pivoted back and forth by an elastic force of this torsion bar, to allow this frame member to support the rear end portion of the flat-type supporting member 36 for seat cushion.

Normally, the flat-type supporting member 36 for seat cushion is not used as it is as a surface cushioning layer, and the surface cushioning layer (pad member) 35 such as a solid knitted fabric, a urethane material, or the like disposed on the flat-type supporting member 36 for seat cushion so as to hide the cushion frames is layered and used (refer to FIG. 1) That is, normally, it is sufficient for the flat-type supporting member 36 for seat cushion to be used to constitute a base cushioning layer to support the surface cushioning layer (pad member) 35 such as a solid knitted fabric or a urethane material and to carry a role of a spring structure such as vibration absorbency, impact absorbency, and so on. Accordingly, so far as it can be elastically supported by the cushion frame 30 via the above-described coil springs 34 or the like, its material is not limited and can be formed using a two-dimensional net member or a three-dimensional net member similarly to the above-described band member 70.

It should be noted that the cushioning layer 25 strained over the back frame 20 covers the upper frame member 22, so as to be hung between the side frames 21 and 21 with low tension of equal to or less than 5% in elongation percentage, and in this embodiment, the cushioning layer 25 is strained to cover the front faces of the above-described pelvis supporting member 50 and the band member 70. The cushioning layer 35 strained over the cushion frame 30 is provided to be engaged with the front frame member 32 at the front end edge on an upper position of the above-described flat-type supporting member 36 for seat cushion, so as to be hung between the side frames 31 and 31 with low tension of equal to or less than 5% in elongation percentage.

Respective cushioning layers 25 and 35 are thus provided to be hung between the side frames 21 and 21, or between the side frames 31 and 31 as a tension structure, so as to serve a cushioning function utilizing the tension. Therefore it becomes possible to use a thin material. For instance, a surface material made of a two-dimensional net member or the like is layered on a thin urethane material having a thickness of about 5 to 20 mm can be used. However, it is yet preferable to use the above-described three-dimensional net member having an excellent cushioning property even in a thin-type.

The function of the seat structure 10 according to the present embodiment will be explained next. When no one is seated, the pelvis supporting member 50 is biased in the direction protruding forwards by the coil springs 60 and 61, with a connecting portion of the swing member 40 and the rear frame member 33 as the center, and pushes the vicinity of pelvis supporting portion of the cushioning layer 25 strained over the back frame 20 via the band member 70 (refer to FIG. 1 and FIG. 4). Accordingly, a slight slack created when the cushioning layer 25 is strained over the back frame 20 to be used as a tension structure can be prevented so that the appearance when no one is seated can be improved.

At the time of normal seating, as shown in FIG. 4, the pelvis supporting member 50 is pushed backwards by the pelvis via the cushioning layer 25 and the band member 70. At this time, according to the present embodiment, the pelvis supporting member 50 pivots backwards with a connecting portion of the swing member 40 and the rear frame member 33 as the center by the swing member 40 till the pelvis supporting member 50 comes to balance with the pressing force of the human body. Supposing that when the pelvis supporting member 50 is structured to pivot with the lower portion 52 of the pelvis supporting member 50 as the center as shown in FIG. 6, since only the vicinity of the upper portion 51 falls backwards without changing the position in front and in the rear around the lower portion 52 of the pelvis supporting member 50, an oppressive feeling to the pelvis is generated in the vicinity of the lower portion 52. However, as in the present embodiment, by pivoting the pelvis supporting member 50 backwards via the swing member 40, the radius of gyration of the pelvis supporting member 50 becomes large, and the pelvis supporting member 50 moves back and forth together with the movement of the human body in all portion from the vicinity of the lower portion 52 to the vicinity of the upper portion 51. Accordingly, the oppressive feeling pressing the pelvis by the vicinity of the lower portion 52 of the pelvis supporting member 50 is reduced and at the same time, follow-up ability to the posture change can be improved.

At the time of vibration input, the flat-type supporting member 36 for seat cushion elastically supported by the cushion frame 30 via the coil springs 34 performs vibration absorption, and at the same time, the pelvis supporting member 50 elastically supported by the above-described coil springs 60 and 61 performs a vibration absorbing function on the seat back 12 side. At this time, according to the present embodiment, since there are the band member 70 provided substantially in a V-shape between the pelvis supporting member 50 and the upper frame member 22 of the back frame 20, and further the lateral band member 80 positioned on the back face side of the band member 70 is included, these members work together with the movement of the pelvis supporting member 50, so that vibration energy can be absorbed within a wide area of the seat back 12.

Figure 3:
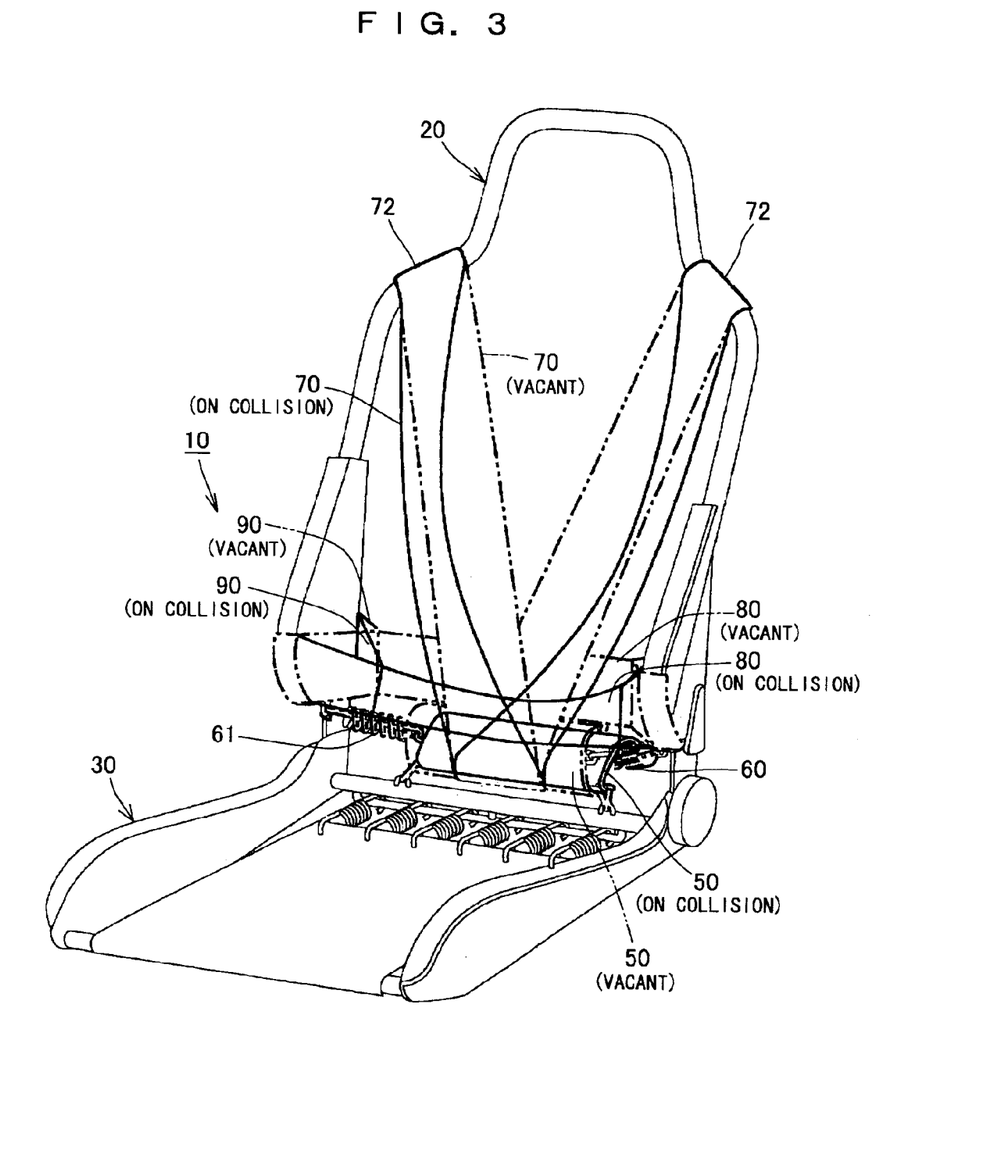
FIG. 3 is a view for explaining a function of the seat structure according to the above embodiment, showing the manner in displacement of a band member and a lateral band member when no one is seated and at the time of collision.
Figure 5A:
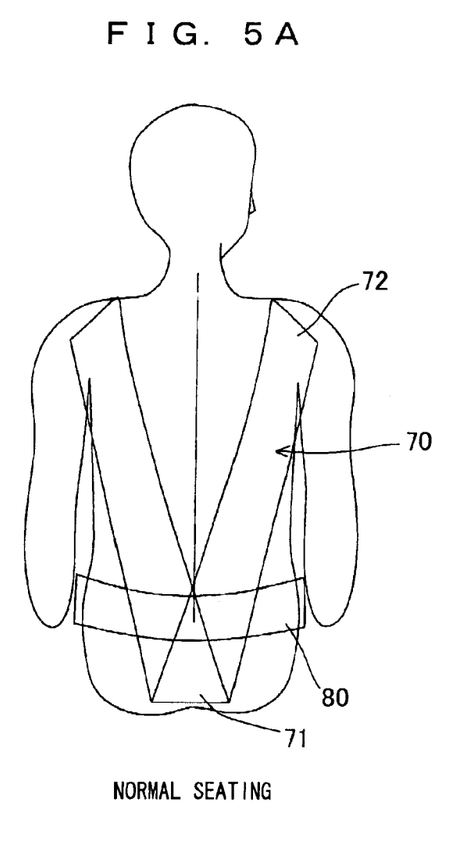
FIGS. 5A and 5B are diagrammatical views for explaining a function of the seat structure according to the above embodiment, showing the manner in displacement of the band member and the lateral band member when no one is seated and the time of collision.
Figure 5B:
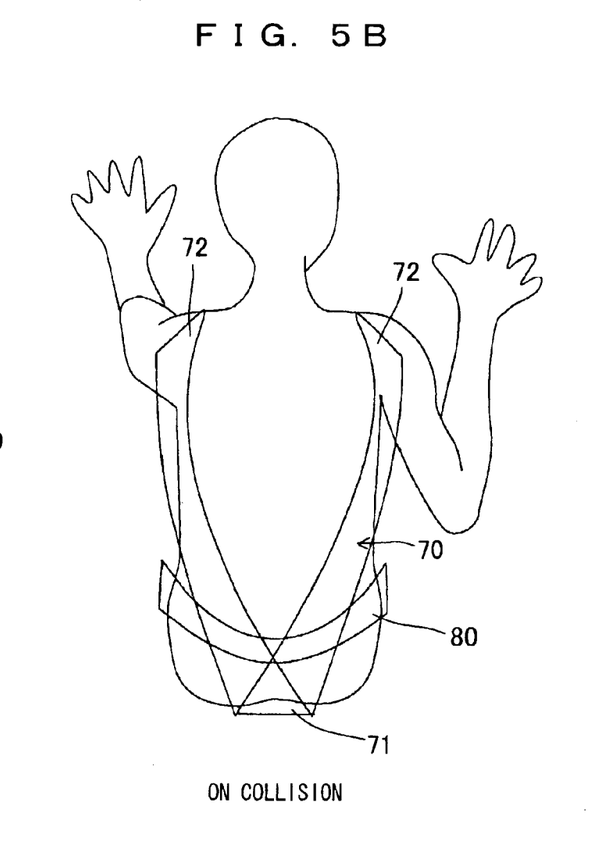

When a large impact caused by collision or the like is inputted, the human body is pushed to the seat back 12. At this time, since the pelvis supporting member 50 falls backwards via the swing member 40, as shown in FIG. 3 and FIG. 4, the vicinity of the lower portion 52 of the pelvis supporting member 50 displaces further backwards compared with that at the time of normal seating. Accordingly, the pelvis portion is not prevented from displacing backwards thereof by abutting the vicinity of the lower portion 52 of the pelvis supporting member 50 similarly to the case in FIG. 6, but is pushed to the pelvis supporting member 50 easily, and when the rotation angle becomes large, further pushed deeply to the pelvis supporting member 50 easily as if to run on the pelvis supporting member 50. At this time, according to the present embodiment, as shown in FIG. 3, FIG. 5A and FIG. 5B, while the band member 70 provided substantially in a V-shape expands towards outside so as to make the human body easily get into the seat back 12, since the vicinity of the lower end 71 of the band member 70 is hard to expand, the manner of the expansion is restrained and the impact force on the human body is softened while keeping to support the body side.

The seat structure of the present invention includes: a swing member provided in a manner to be able to swing at least back and forth on a rear frame member positioned in the vicinity of the rear of a seat cushion; a pelvis supporting member connected to the swing member in the vicinity of the lower portion of the pelvis supporting member, and disposed behind the pelvis portion of a seated person; and an elastic member to support the pelvis supporting member biasing in the direction pushed forwards in a normal seating state. Accordingly, vibration inputted from the seat back side and as if patting on the back of the human body can be absorbed by the pelvis supporting member supported elastically. Besides, since the pelvis supporting member is connected to the rear frame member via the swing member, since pivoting movement in a back-and-forth direction of the pelvis supporting member is performed with a connecting portion of the swing member and the rear frame member as the center, and the radius of gyration is large, the vicinity of the lower portion of the pelvis supporting member never presses the pelvis. Accordingly, when impact force due to collision or the like is inputted, a portion from the waist to the haunches (pelvis) of the human body can be held quickly and deeply into the seat back, and impact absorbing ability can be improved more than was previously possible. Further, a slight slack at the time of no load (vacant) on the cushioning layer can be restrained by the pelvis supporting member supported elastically, so that the appearance can be improved. Besides, by disposing band members on the seat back and allowing the band members to work together with the pelvis supporting member, an impact absorbing function can be further improved.

What is claimed is:

1. A seat structure including a seat back and a seat cushion, said seat structure comprising:
    a swing member provided to be able to swing at least back and forth, on a rear frame member positioned around a rear of said seat cushion;
    a pelvis supporting member connected to said swing member at a vicinity of a lower portion of the pelvis supporting member, and disposed in a lower portion of the seat back;
    an elastic member to urge the pelvis supporting member in a direction pushed forward; and
    a cushioning layer covering said pelvis supporting member, and provided on a back frame forming said seat back.

2. The seat structure according to claim 1, wherein said pelvis supporting member is formed in a plate shape having a predetermined width and length.

3. The seat structure according to claim 2, wherein said pelvis supporting member is formed in a plate shape having a predetermined width and length, and a vicinity of an upper portion of said pelvis supporting member is bent backwards.

4. The seat structure according to claim 3, wherein a vicinity of a center portion of said pelvis supporting member along a width thereof is bulged backwards.

5. The seat structure according to claim 1, wherein at least a portion of said pelvis supporting member is made of synthetic resin.

6. The seat structure according to claim 1,
wherein said elastic member is formed having coil springs; at least one of said coil springs disposed on each side of said pelvis supporting member, and
wherein one engaging end of a coil spring is connected to each side portion of said pelvis supporting member and an other engaging end of the coil spring is connected to a frame member positioned above said rear frame member at a portion positioned ahead of a connective position of the one engaging end with a side portion of the pelvis supporting member, respectively.

7. The seat structure according to claim 1,
wherein said swing member comprises a low elastic member lower in elasticity rate than said elastic member; and
wherein one end of said swing member is connected to the rear frame member and an other end of said swing member is connected to the vicinity of the lower portion of said pelvis supporting member.

8. The seat structure according to claim 1, wherein said seat structure includes a band member provided on a back face side of said cushioning layer of the seat back, in a manner that an upper end thereof is connected to a vicinity of an upper portion of the back frame and a lower end thereof is connected to said pelvis supporting member respectively.

9. The seat structure according to claim 8, wherein said band member is provided substantially in a V shape.

10. The seat structure according to claim 8, wherein a lateral band member is provided above said pelvis supporting member and is between side frame members for forming the back frame.

11. The seat structure according to claim 10, wherein said lateral band member is connected to respective side frame members via elastic members.

12. The seat structure according to claim 1, wherein at least a portion of said pelvis supporting member is made of a three-dimensional net member.

13. The seat structure according to claim 1, wherein at least a portion of said pelvis supporting member is made of a two-dimensional net member.

14. The seat structure according to claim 1, wherein at least a portion of said pelvis supporting member is made of rubber.

15. The seat structure according to claim 1,
wherein said swing member comprises a non-elastic member lower in elasticity rate than said elastic member; and
wherein one end of said swing member is connected to the rear frame member and an other end of said swing member is connected to the vicinity of the lower portion of said pelvis supporting member.

* * * * *